(12) United States Patent
Spielman, Jr.

(10) Patent No.: US 11,409,299 B2
(45) Date of Patent: Aug. 9, 2022

(54) DETERMINING OBJECT DETECTION AREA BASED ON ARTICULATION ANGLE

(71) Applicant: Caterpillar Inc., Peoria, IL (US)

(72) Inventor: Michael A. Spielman, Jr., Brookfield, IL (US)

(73) Assignee: Caterpillar Inc., Peoria, IL (US)

( * ) Notice: Subject to any disclaimer, the term of this patent is extended or adjusted under 35 U.S.C. 154(b) by 169 days.

(21) Appl. No.: 16/947,832

(22) Filed: Aug. 19, 2020

(65) Prior Publication Data

US 2022/0057802 A1 Feb. 24, 2022

(51) Int. Cl.
| | |
|---|---|
| *G05D 1/02* | (2020.01) |
| *G05D 1/00* | (2006.01) |
| *E02F 9/26* | (2006.01) |
| *E02F 3/43* | (2006.01) |
| *G06V 20/58* | (2022.01) |
| *B60R 1/28* | (2022.01) |

(52) U.S. Cl.
CPC ............. *G05D 1/0214* (2013.01); *B60R 1/28* (2022.01); *E02F 3/435* (2013.01); *E02F 9/264* (2013.01); *G05D 1/0055* (2013.01); *G06V 20/58* (2022.01); *G05D 2201/0202* (2013.01)

(58) Field of Classification Search
None
See application file for complete search history.

(56) References Cited

U.S. PATENT DOCUMENTS

| | | | | |
|---|---|---|---|---|
| 9,667,875 | B2 * | 5/2017 | Sanchez | ................... B60R 1/00 |
| 10,421,400 | B2 * | 9/2019 | Imaizumi | ................. B60R 1/00 |
| 10,721,442 | B2 * | 7/2020 | Shimizu | ................ G06T 3/0018 |

FOREIGN PATENT DOCUMENTS

| | | |
|---|---|---|
| CN | 109429039 A | 3/2019 |
| CN | 110363085 A | 10/2019 |
| EP | 3012154 B1 | 5/2018 |
| WO | 2018/177719 A1 | 10/2018 |

* cited by examiner

*Primary Examiner* — Todd Melton
(74) *Attorney, Agent, or Firm* — Harrity & Harrity LLP

(57) ABSTRACT

A controller may determine, using a first sensor device of the machine, an articulation angle of the machine. The controller may adjust, based on the articulation angle, a size of an object detection area to obtain an adjusted object detection area. The object detection area may be associated with an articulation joint of the machine.

20 Claims, 4 Drawing Sheets

DETERMINING OBJECT DETECTION AREA BASED ON ARTICULATION ANGLE

TECHNICAL FIELD

The present disclosure relates generally to determining an object detection area and, for example, to determining an object detection area based on an articulation angle of a machine.

BACKGROUND

An articulated machine includes a front portion and a rear portion that are configured to articulate with respect to each other via an articulation joint of the articulated machine. The articulated machine may include an object detection system to detect objects, that appear as obstructions, within the vicinity of the articulation joint. For example, the object detection system may detect one or more operators servicing one or more components (of the articulated machine) within the vicinity of the articulation joint. Detection of objects within the vicinity of the articulation joint may cause the articulated machine to alert an operator inside a cabin of the articulated machine and/or reduce or prevent movement of the articulated machine while the objects remain within the vicinity of the articulation joint. However, such object detection system may erroneously detect portions of the articulated machine as obstructions. Erroneously detecting portions of the articulated machine as obstructions may disrupt machine operation.

U.S. Pat. No. 10,421,400 (the '400 patent) discloses that a surroundings monitoring system for a work vehicle includes a bending angle data acquirer acquiring bending angle data between a vehicle body front and rear portions, and a shot image data acquirer acquiring shot images respectively shot by multiple cameras. The '400 patent further discloses that the surroundings monitoring system further includes a determiner determining, from the multiple bending angle ranges, a bending angle range to which the bending angle belongs, and a selector selecting, from a plurality of the representative images, a representative image that belongs to the determined bending angle range, and a display controller causing a display to simultaneously display the generated bird's eye image and the selected representative image.

While the '400 patent discloses a surroundings monitoring system, the patent does not resolve the issue of erroneously detecting portions of the articulated machine as obstructions.

The controller of the present disclosure solves one or more of the problems set forth above and/or other problems in the art.

SUMMARY

In some implementations, a method performed by a controller of a machine includes detecting, based on information from a first sensor device of the machine, a change in an articulation angle of the machine, wherein the articulation angle is associated with an articulation joint of the machine; and adjusting, based on detecting the change in the articulation angle, a size of an object detection area to obtain an adjusted object detection area, wherein the object detection area is associated with the articulation joint of the machine.

In some implementations, a controller of a machine includes one or more memories; and one or more processors configured to: determine, using a first sensor device of the machine, an articulation angle of the machine; and adjust, based on the articulation angle, a size of an object detection area to obtain an adjusted object detection area, the object detection area being associated with an articulation joint of the machine.

In some implementations, a system includes one or more sensor devices of a machine; and a controller, of the machine, configured to: determine, based on the one or more sensor devices, an articulation angle of the machine; and identify, based on the articulation angle of the machine, a portion of an object detection area, the object detection area being associated with an articulation joint of the machine.

DETAILED DESCRIPTION

This disclosure relates to a process for determining an object detection area based on an articulation angle of a machine. The term "machine" may refer to a machine that performs an operation associated with an industry such as, for example, mining, construction, farming, transportation, or another type of industry. Moreover, one or more implements may be connected to the machine. The process for determining an object detection area based on an articulation angle of a machine has applicability to articulated machines. The term "articulated machine" may refer to a machine that includes a front portion and a rear portion that are configured to articulate with respect to each other via an articulation joint of the articulated machine.

Figure 1:
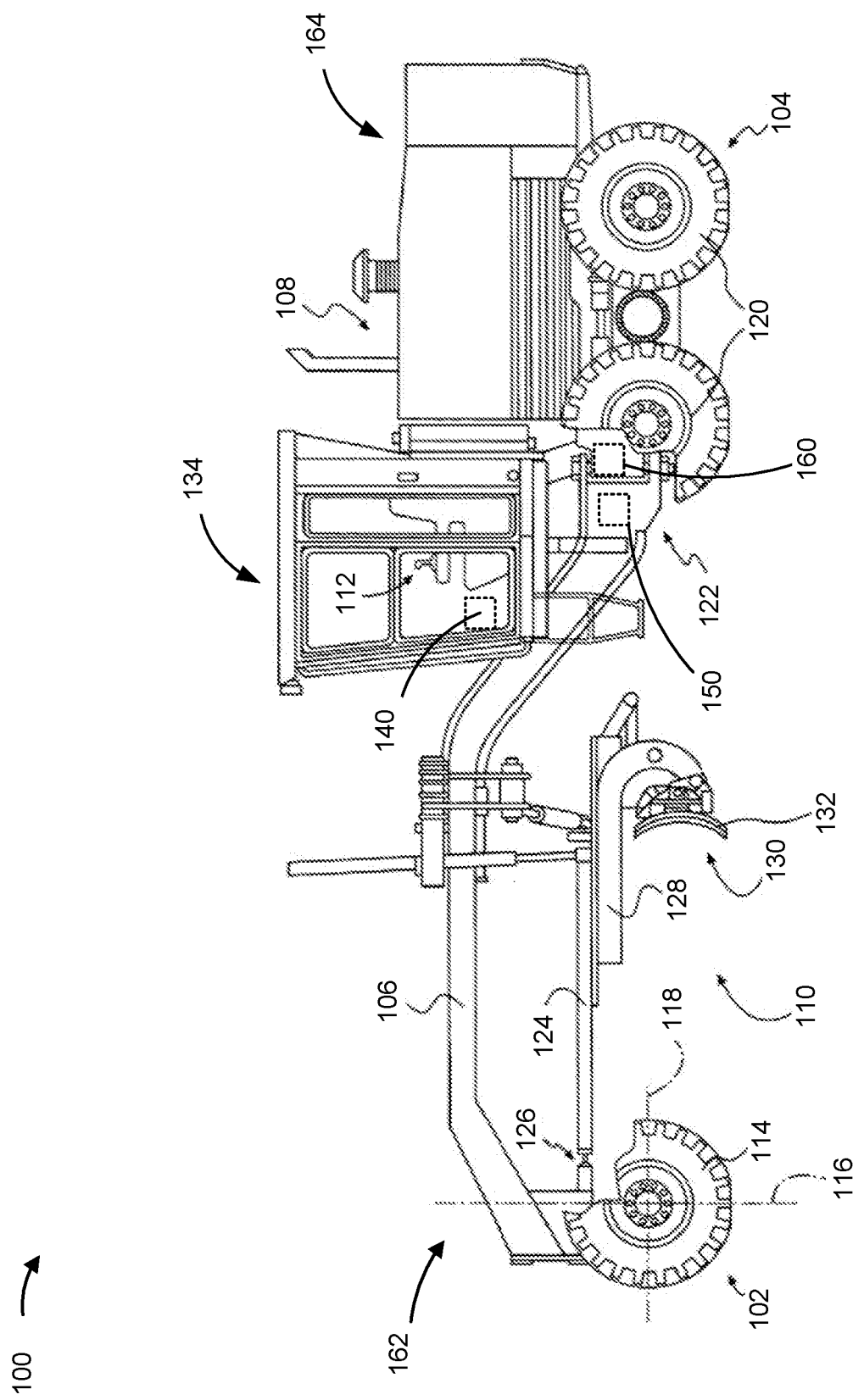
FIG. 1 is a diagram of an example machine described herein.

FIG. 1 is a diagram of an example machine 100 described herein. As shown in FIG. 1, the machine 100 is embodied as a motor grader. Alternatively, the machine 100 may be another type of articulated machine such as a wheel loader, a dump truck, an articulated soil compactor, and/or the like.

As shown in FIG. 1, machine 100 includes a steerable traction device 102, a driven traction device 104, a frame 106 connecting steerable traction device 102 to driven traction device 104, a power source 108 supported by driven traction device 104, and a transmission (not shown) configured to transmit power from power source 108 to driven traction device 104. Machine 100 also includes a work implement such as, for example, a drawbar-circle-moldboard assembly (DCM) 110, and a control system 112.

Steerable traction device 102 includes one or more wheels 114 located on each side of machine 100 (only one side shown). Additionally, or alternatively, steerable traction device 102 may include tracks, belts, or other traction devices. Wheels 114 may be rotatable about a vertical axis 116 for use during steering.

Driven traction device 104 includes wheels 120 located on each side of machine 100 (only one side shown). Additionally, or alternatively, driven traction device 104 may include tracks, belts, or other traction devices. Frame 106 may connect steerable traction device 102 to driven traction device 104. Frame 106 may include an articulation joint 122 that connects driven traction device 104 to frame 106.

Power source 108 may be an engine such as, for example, a diesel engine, a gasoline engine, a natural gas engine, or another type of engine. Alternatively, power source 108 may be another source of power such as a fuel cell, a power storage device, or another source of power.

DCM 110 includes a drawbar assembly 124 supported by a center portion of frame 106 via a hydraulic ram assembly and connected to a front portion of frame 106 via a ball and socket joint 126. DCM 110 may be both vertically and horizontally positioned relative to frame 106. A circle assembly 128 may be connected to drawbar assembly 124 via additional hydraulic rams and may be configured to support a moldboard assembly 130 having a blade 132. DCM 110 may rotate circle assembly 128 and moldboard assembly 130 relative to drawbar assembly 124 (e.g., around an axis of rotation). Blade 132 may be positioned both horizontally and vertically, and oriented relative to circle assembly 128. In some examples, DCM 110 may include another work implement such as, for example, a ripper, a bucket, or another type of work implement.

Control system 112 may include one or more buttons, joysticks, levers, user interfaces, and/or the like used to control movement of machine 100. Control system 112 may control a rotation angle associated with DCM 110, drawbar assembly 124, circle assembly 128, and/or moldboard assembly 130. Control system 112 may cause wheels 114 to lean about a horizontal axis 118 to oppose a reaction force caused by DCM 110 engaging a work surface, or to adjust a height of DCM 110. Control system 112 may control a lean angle of wheels 114. Control system 112 may further control an articulation angle of machine 100 (e.g., via articulation joint 122). For example, control system 112 may cause machine 100 to articulate steerable traction device 102 relative to driven traction device 104 via articulation joint 122.

As shown in FIG. 1, machine 100 further includes an operator cabin 134, a controller 140 (e.g., an electronic control module (ECM)), an articulation area sensor device 150, an articulation sensor device 160, a front portion 162, and a rear portion 164. Operator cabin 134 may include control system 112. Controller 140 may include one or more memories and one or more processors. Controller 140 may receive information identifying objects identified in an object detection area.

The object detection area may correspond to a detectable area, associated with articulation joint 122, in which one or more objects may be detected. The object detection area may include an area within a threshold distance of articulation joint 122. The object detection area may be defined using a two-dimensional Cartesian coordinate system, a three-dimensional Cartesian coordinate system, and/or the like. In some examples, the object detection area and/or the threshold distance may be determined by controller 140 (e.g., based on historical data identifying object detection areas, threshold distances, objects detected (e.g., that include portions of machine 100), and/or the like). Additionally, or alternatively, the object detection area and/or the threshold distance may be determined by an operator associated with machine 100. Information identifying the object detection area and/or information identifying the threshold distance may be stored in a memory associated with machine 100, a memory of controller 140, and/or the like. The object detection area and/or the threshold distance are discussed below in connection with FIGS. 2A and 2B.

Controller 140 may determine an articulation angle portion of the object detection area, as explained in more detail below in connection with FIGS. 2A and 2B. The articulation angle portion may correspond to a portion of the object detection area that is defined by the articulation angle of machine 100 (e.g., a portion corresponding to the articulation angle), as explained in more detail below in connection with FIGS. 2A and 2B. The articulation angle portion may exclude portions of machine 100 (e.g., components of machine 100) to prevent erroneously detecting the portions of the articulated machine as obstructions. Controller 140 may determine whether an object is detected in the articulation angle portion and disregard objects identified in a machine portion of the object detection area. The machine portion may correspond to a remaining portion of the object detection area that excludes the articulation angle portion, as explained in more detail below in connection with FIGS. 2A and 2B. The machine portion may include the portions of machine 100 (e.g., components of machine 100).

Articulation area sensor device 150 may include a device that detects objects in the object detection area (associated with articulation joint 122) and transmits (e.g., to controller 140) object detection information (e.g., sensor data) identifying objects that are detected in the object detection area. Articulation area sensor device 150 may include a light detection and ranging (LIDAR) device, a sound navigation and ranging (SONAR) device, a radio detection and ranging (RADAR) device, a camera, and/or the like.

In some examples, articulation area sensor device 150 may be configured (e.g., by controller 140, the operator, and/or the like) to identify objects within the object detection area. For instance, articulation area sensor device 150 may be configured (e.g., by controller 140, the operator, and/or the like) with the information identifying the object detection area and/or the information identifying the threshold distance.

Articulation area sensor device 150 may be located at one or more locations, of an exterior surface of machine 100, that facilitate detection of objects in the object detection area. For example, articulation area sensor device 150 may be located at one or more locations, of an exterior surface of machine 100, within a threshold distance of articulation joint 122.

In some implementations, articulation area sensor device 150 may be configured to change an object detection direction (e.g., a direction in which articulation area sensor device 150 detects objects) manually. For example, articulation area sensor device 150 may be configured to change the object detection direction based on manual adjustments by one or more operators associated with machine 100 (e.g., manual adjustment using input from the user interfaces in operator cabin 134, using input from one or more user interfaces of a user device, using physical interactions of the one or more operators with articulation area sensor device 150, and/or the like). Alternatively, articulation area sensor device 150 may be configured to change the object detection direction automatically (e.g., based on a movement of machine 100, an orientation of machine 100, and/or the like).

Articulation sensor device 160 may include a device that determines a measure of articulation of machine 100. The measure of articulation may correspond to the articulation angle of machine 100. Articulation sensor device 160 may transmit (e.g., to controller 140) articulation angle information identifying the articulation angle of machine 100. Articulation sensor device 160 may include a rotary sensor, an inertial measurement unit (IMU), an in-cylinder sensor, and/or the like to determine the measure of articulation of machine 100.

In some examples, articulation sensor device 160 may determine a measure of articulation, via articulation joint 122, between front portion 162 of machine 100 and rear portion 164 of machine 100. Additionally, or alternatively, articulation sensor device 160 may determine a measure of articulation of steerable traction device 102 relative to driven traction device 104. The measure of articulation may correspond to the articulation angle of machine 100. Additionally, or alternatively, articulation sensor device 160 may determine a measure of steering of steerable traction device 102 (e.g., a steering angle of steerable traction device 102) and determine the articulation angle of machine 100 based on the measure of steering of steerable traction device 102.

Articulation sensor device 160 may be located at one or more locations, of an interior or exterior surface of machine 100, that facilitate determining the articulation angle of machine 100. For example, articulation sensor device 160 (e.g., embodied as the rotary sensor and/or the IMU) may be located on the articulation joint and may determine a measure of rotation of the articulation joint. The measure of rotation of the articulation joint may correspond to the articulation angle of machine 100. Alternatively, articulation sensor device 160 (e.g., embodied as the in-cylinder sensor) may be located on one or more cylinders (not shown) that cause machine 100 to articulate and may determine a measure of displacement of the one or more cylinders. The measure of displacement may correspond to the articulation angle of machine 100.

In some examples, articulation sensor device 160 may monitor the articulation angle of machine 100 and determine a change in the articulation angle of machine 100. For example, articulation sensor device 160 may periodically (e.g., every second, every ten seconds, every thirty seconds, and/or the like) determine the articulation angle of machine 100 and determine the change in the articulation angle of machine 100. For instance, articulation sensor device 160 may compare the articulation angle determined at a first time and the articulation angle determined at a second time and may determine the change in the articulation angle based on the comparison. Articulation sensor device 160 may include, in the articulation angle information, information identifying the change in the articulation angle.

As indicated above, FIG. 1 is provided as an example. Other examples may differ from what was described in connection with FIG. 1.

Figure 2B:
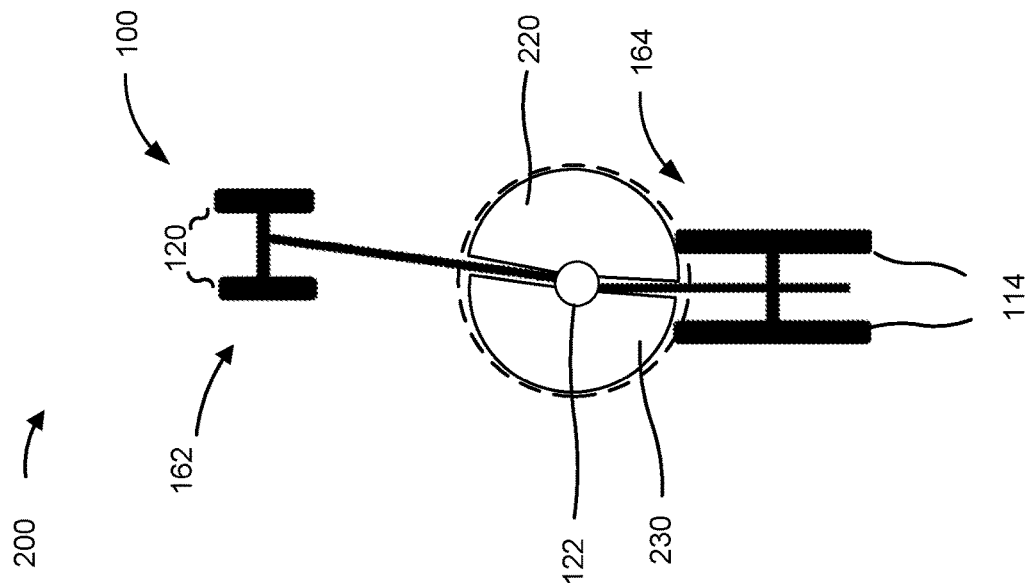
FIGS. 2A and 2B are diagrams of example implementations described herein.
Figure 2A:
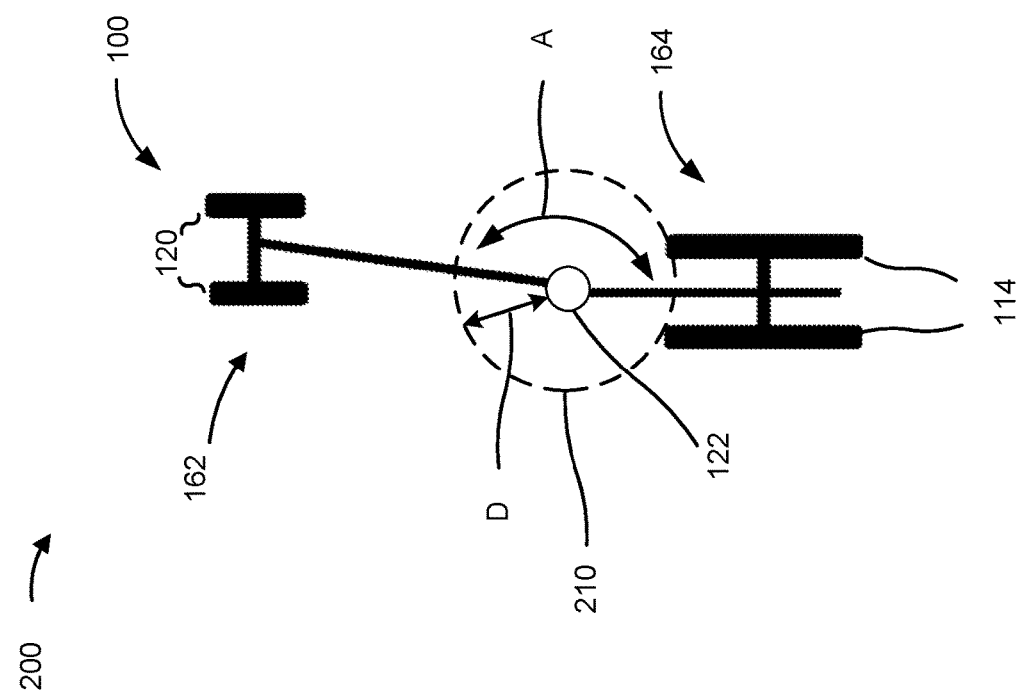

FIGS. 2A and 2B are diagrams of example implementations 200 described herein. As shown in FIG. 2A, an object detection area 210 (corresponding to the object detection area discussed in connection with FIG. 1) may include an area within a threshold distance (D) (corresponding to the threshold distance discussed in connection with FIG. 1) of articulation joint 122. The area may have a shape of a circle, an ellipse, an oval, a square, a rectangle, and/or the like.

Object detection area 210 may correspond to a three-dimensional space defined by the area within threshold distance (D), a top surface of machine 100 (e.g., a plane parallel to the top surface), and a ground (e.g., a plane parallel to the ground surface) on which machine 100 travels. As an example, object detection area 210 may have a shape of a sphere, a cube, and/or the like. The shapes of object detection area 210 are merely provided as examples. Other examples may differ from what is described with regard to the shapes.

As shown in FIG. 2A, machine 100 may be articulated to an articulation angle (A). Articulation angle (A) may define an angle between front portion 162 and rear portion 164. Articulation angle (A) may correspond to an angle included in a range of possible articulation angles for machine 100. In some examples, a value of articulation angle (A) may indicate a side (e.g., left side or right side) of front portion 162 and a side (e.g., left side or right side) of rear portion 164 that form articulation angle (A).

For instance, a value of articulation angle (A) that satisfies a threshold angle may indicate an angle that is formed between a right side of front portion 162 and a right side of rear portion 164. Conversely, a value of articulation angle (A) that does not satisfy the threshold angle may indicate an angle that is formed between a left side of front portion 162 and a left side of rear portion 164. As shown in FIG. 2A, articulation angle (A) is formed between the right side of front portion 162 and the right side of rear portion 164.

As shown in FIG. 2B, object detection area 210 may include an articulation angle portion 220 (corresponding to the articulation angle portion discussed in connection with FIG. 1) and a machine portion 230 (corresponding to the machine portion discussed in connection with FIG. 1). Articulation angle portion 220 may correspond to a portion of the object detection area 210 that is defined by articulation angle (A) formed between front portion 162 (e.g., a side of front portion 162) and rear portion 164 (e.g., a side of rear portion 164). Articulation angle portion 220 may include a space defined by articulation angle (A), front portion 162 (e.g., a side of front portion 162), and rear portion 164 (e.g., a side of rear portion 164).

For example, as shown in FIG. 2B, articulation angle portion 220 may correspond to a portion of the object detection area 210 that is defined by articulation angle (A) formed between the right side of front portion 162 and the right side of rear portion 164. Boundaries of articulation angle portion 220 (e.g., boundaries of the portion of object detection area 210 corresponding to articulation angle portion 220) may be defined by a value of articulation angle (A), the right side of front portion 162, and the right side of rear portion 164. As explained above, articulation angle portion 220 may exclude portions of machine 100 (e.g., components of machine 100) to prevent erroneously detecting the portions of the articulated machine as obstructions. Machine portion 230 may correspond to a remaining portion of object detection area 210 that excludes articulation angle portion 220.

In some examples, based on the value of the articulation angle (A), controller 140 may identify a side (e.g., left side or right side) of front portion 162 that forms articulation angle (A) and a side (e.g., left side or right side) of rear portion 164 that forms articulation angle (A), in a manner similar to the manner described above. Based on the value of articulation angle (A), the identified side of front portion 162, and the identified side of rear portion 164, controller 140 may identify articulation angle portion 220 corresponding to articulation angle (A). For example, controller 140 may determine boundaries of articulation angle portion 220, an area associated with articulation angle portion 220, a size of articulation angle portion 220, dimensions associated with articulation angle portion 220, and/or the like based on the value of articulation angle (A), the identified side of front portion 162 forming articulation angle (A), and the identified side of rear portion 164 forming articulation angle (A).

In some examples, as machine 100 continues to move, machine 100 may further articulate in a direction corresponding to articulation angle (A) and, accordingly, reduce the space defined by articulation angle (A), front portion 162, and rear portion 164. In this regard, controller 140 may analyze articulation angle portion 220 (instead of machine portion 230) to prevent machine 100 from further articulating in such direction in the event an object is located in the articulation angle portion.

In some examples, controller 140 may determine one or more articulation angle portions for one or more articulation angles included in the range of possible articulation angles of machine 100, in a manner similar to the manner described above. For example, controller 140 may obtain information identifying the range of possible articulation angles of machine 100 (e.g., from a memory associated with machine 100) and may determine the one or more articulation angle portions corresponding to the one or more articulation angles (included in the range of possible articulation angles of machine 100).

Controller 140 may store, in a data structure, information identifying the one or more articulation angles in association with information identifying the one or more articulation angle portions corresponding to the one or more articulation angles, as described below in connection with FIG. 3. The information identifying the one or more articulation angles may include one or more values of the one or more articulation angles. The information identifying the one or more articulation angle portions may include information identifying boundaries of the one or more articulation angle portions, an area associated with the one or more articulation angle portions, a size of the one or more articulation angle portions, dimensions associated with the one or more articulation angle portions, and/or the like.

As indicated above, FIGS. 2A and 2B are provided as examples. Other examples may differ from what was described in connection with FIGS. 2A and 2B.

Figure 3:
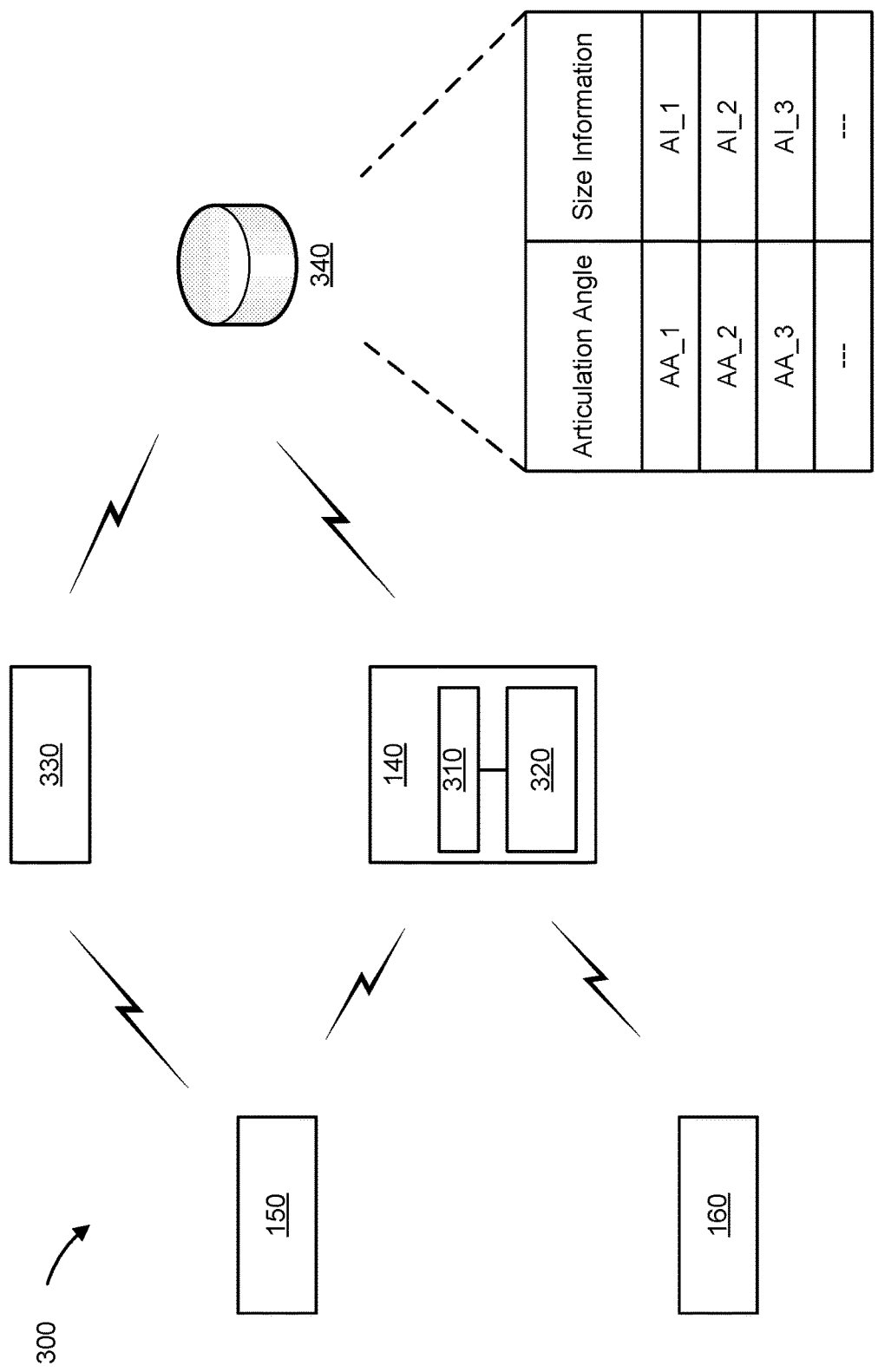
FIG. 3 is a diagram of an example system, described herein, that may be implemented in association with the machine of FIG. 1.

FIG. 3 is a diagram of an example system 300, described herein, that may be implemented in association with the machine of FIG. 1 (e.g., machine 100). As shown in FIG. 3, system 300 includes controller 140, articulation area sensor device 150, articulation sensor device 160, a user device 330, and a data storage 340.

Controller 140 may include one or more processors 310 (referred to herein individually as "processor 310," and collectively as "processors 310"), and one or more memories 320 (referred to herein individually as "memory 320," and collectively as "memories 320"). A processor 310 is implemented in hardware, firmware, and/or a combination of hardware and software. A processor 310 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. A processor 310 may be capable of being programmed to perform a function.

A memory 320 includes a random-access memory (RAM), a read only memory (ROM), and/or another type of dynamic or static storage device (e.g., a flash memory, a magnetic memory, and/or an optical memory) that stores information and/or instructions for use by a processor 310 to perform a function. For example, when performing a function, controller 140 (e.g., using a processor 310 and a memory 320) may obtain the information identifying the object detection area, the object detection information (e.g., from articulation area sensor device 150), and the articulation angle information (e.g., from articulation sensor device 160). Controller 140 may identify an articulation angle portion, of the object detection area, corresponding to the articulation angle of machine 100 and analyze a portion of the object detection information, corresponding to the articulation angle portion, to determine whether an object has been detected in the articulation angle portion.

In some instances, controller 140 may analyze the portion of the object detection information (e.g., when the object detection information includes image data) using one or more object detection techniques (e.g., a Single Shot Detector (SSD) technique, a You Only Look Once (YOLO) technique, and/or the like) to determine whether an object has been detected in the articulation angle portion.

Articulation area sensor device 150 may be configured to transmit the object detection information (e.g., LIDAR data, SONAR data, RADAR data, image data, and/or the like) to controller 140 to enable controller 140 to analyze the object detection information and determine, based on the analysis, whether an object has been detected in the articulation angle portion. In some examples, articulation area sensor device 150 may be configured (e.g., by controller 140 and/or the operator) to detect objects in the articulation angle portion and disregard objects in the machine portion. Additionally, articulation area sensor device 150 may be configured (e.g., by controller 140 and/or the operator) to transmit a portion of the object detection information corresponding to the articulation angle portion (e.g., a portion that identifies the objects detected in the articulation angle portion) and disregard a remaining portion of the object detection information (e.g., disregard a portion of the object detection information corresponding to the machine portion).

By configuring articulation area sensor device 150 to detect objects in the articulation angle portion and transmit the portion of the object detection information corresponding to the articulation angle portion, articulation area sensor device 150 may prevent erroneously detecting portions of machine 100 as obstructions. In some examples, articulation area sensor device 150 may be configured to transmit the object detection information to controller 140 based on a request from controller 140.

Additionally, or alternatively, articulation area sensor device 150 may be configured to transmit the object detection information to controller 140 periodically (e.g., every thirty seconds, every minute, every five minutes, upon occurrence of a trigger, and/or the like). In some examples, articulation area sensor device 150 may be preconfigured with the period of time for transmitting the object detection information. Alternatively, the period of time for transmitting the object detection information may be determined by an operator associated with machine 100. Alternatively, the period of time for transmitting the object detection information may be determined by controller 140 (e.g., based on object detection historical data regarding machine 100). The object detection historical data may include historical data regarding periods of time for transmitting the object detection information, frequency of movements of machine 100, and/or the like.

Articulation sensor device 160 may be configured to transmit the articulation angle information to controller 140 to enable controller 140 to determine the articulation angle of machine 100 and determine the articulation angle portion of the object detection area corresponding to the articulation angle (and ignore the machine portion of the object detection area). Articulation sensor device 160 may be configured to transmit the articulation angle information to controller 140 based on a request from controller 140.

Additionally, or alternatively, articulation sensor device 160 may be configured to transmit the articulation angle information to controller 140 periodically (e.g., every second, every ten seconds, every thirty seconds, upon occurrence of a trigger, and/or the like). In some examples, articulation sensor device 160 may be preconfigured with the period of time for transmitting the articulation angle information. Alternatively, the period of time for transmitting the articulation angle information may be determined by an operator associated with machine 100. Alternatively, the period of time for transmitting the articulation angle information may be determined by controller 140 (e.g., based on articulation historical data regarding machine 100). The articulation historical data may include historical data regarding periods of time for transmitting the articulation angle information, frequency of movements of machine 100, and/or the like.

User device 330 may include a smart phone, a laptop computer, a tablet computer, a remote control for remote control of machine 100, and/or the like. User device 330 may be used to control operation of machine 100, configure controller 140, configure articulation area sensor device 150, configure articulation sensor device 160, and/or configure data storage 340.

Data storage 340 may include a device that stores a data structure (e.g., a database, a linked list, a table, and/or the like). The data structure may store information identifying different articulation angles of machine 100 in association with corresponding size information that identifies different articulation angle portions of the object detection area associated with the articulation angles. The information identifying the articulation angle may include a value of the articulation angle.

The size information of an articulation angle portion may include information that can be used to identify the articulation angle portion such as, for example, information identifying boundaries of the articulation angle portion, an area associated with the articulation angle portion, a size of the articulation angle portion, dimensions associated with the articulation angle portion, and/or the like. The articulation angle portion may be based on an amount of space between front portion 162 of machine 100 and rear portion 164 of machine 100 as a result of an articulation of machine 100 to the articulation angle.

Controller 140 may use the size information to adjust a size of an object detection area in order to determine whether an object has been detected in the articulation portion. In this regard, as the articulation angle increases, the size of the object detection area may increase. Conversely, as the articulation angle decreases, the size of the object detection area may decrease.

In the data structure, information identifying a first articulation angle may be associated with first size information that identifies a first articulation angle portion of the object detection area, information identifying a second articulation angle may be associated with second size information that identifies a second articulation angle portion of the object detection area, and so on.

In some implementations, the information identifying the different articulation angles and/or the size information identifying the different articulation angle portions of the object detection area may be provided (to data storage 340) by controller 140, as discussed above in connection with FIGS. 2A and 2B. Additionally, or alternatively, the information identifying the different articulation angles and/or the size information identifying the different articulation angle portions of the object detection area may be provided (to data storage 340) by the operator associated with machine 100. The operator may provide the information identifying the different articulation angles and/or the size information identifying the different articulation angle portions using a device associated with the operator. The device associated with the operator may include user device 330, the user interfaces included in operator cabin 134, and/or the like.

For instance, the operator may obtain, using the device, information identifying machine 100 articulated to the first articulation (e.g., from a memory associated machine 100). The information identifying machine 100 (articulated to the first articulation angle) may include a three-dimensional depiction of machine 100 articulated to the first articulation angle. The three-dimensional depiction may include information identifying the object detection area. The three-dimensional depiction, including the object detection area, may be provided to the operator via a display of the device.

The operator may interact with the display to select the first articulation angle portion (of the object detection area). For example, the operator may interact with the display (e.g., tactile interaction with the display) to select information identifying the first articulation angle portion (e.g., select boundaries of the first articulation angle portion, an area associated with the first articulation angle portion, a size of the first articulation angle portion, dimensions associated with the first articulation angle portion, and/or the like). Additionally, or alternatively, the operator may input, using the device, textual information for the information identifying the first articulation angle portion.

The operator may store, using the device and in the data structure of data storage 340, the information identifying the first articulation angle in association with the first size information identifying the first articulation angle portion. The operator may perform similar actions to store, in data storage 340, the information identifying the second articulation angle in association with the second size information identifying the second articulation angle portion, and so on.

In some implementations, controller 140 may obtain information from articulation area sensor device 150, articulation sensor device 160, and/or data storage 340 to determine whether an object has been detected in an articulation angle portion, of the object detection information, that corresponds to an articulation angle of machine 100, as described in more detail below. In some examples, controller 140 may obtain, from articulation sensor device 160, the articulation angle information that includes the information identifying the articulation angle of machine 100. Controller 140 may determine the articulation angle of machine 100 based on the information identifying the articulation angle. Controller 140 may determine the articulation angle in order to determine whether an object has been detected in the articulation angle portion corresponding to the articulation angle and, thereby, prevent erroneously detecting portions of machine 100 as obstructions.

In some examples, controller 140 may transmit, to articulation sensor device 160, an articulation angle request for the articulation angle information and may receive the articulation angle information from articulation sensor device 160 based on the articulation angle request. For example, controller 140 may periodically transmit, to articulation sensor device 160, the articulation angle request for the articulation angle information (e.g., every second, every ten seconds, every thirty seconds, and/or the like). The period of time for transmitting the articulation angle request may be determined by controller 140 (e.g., based on historical data regarding machine 100). The historical data may be stored in a memory associated with machine 100 and may include historical data regarding periods of time for transmitting articulation angle requests for the articulation angle information, frequency of movements of machine 100, and/or the like.

Additionally, or alternatively, controller 140 may periodically receive the articulation angle information from articulation sensor device 160, in a manner similar to the manner described herein. Additionally, or alternatively, controller 140 may transmit the articulation angle request to articulation sensor device 160 based on controller 140 detecting one or more events and may receive the articulation angle information from articulation area sensor device 150 based on the articulation angle request. For example, the one or more events may include receiving an object detection request, from the operator associated with machine 100, to determine whether an object is detected in the object detection area. The operator may transmit the object detection request via the user interfaces of operator cabin 134, via user device 330, and/or the like.

Additionally, or alternatively, the one or more events may include detecting a movement of machine 100 based on input from control system 112, detecting a steering of machine 100 (e.g., steering of steerable traction device 102 and/or of wheels 114) based on input from control system 112, and/or the like.

In some examples, controller 140 may detect a change in the articulation angle of machine 100 based on the articulation angle information. For example, the articulation angle information may include the information identifying the change in the articulation angle, as described above. Additionally, or alternatively, controller 140 may compare the articulation angle (identified in the articulation angle information) and the articulation angle (identified in prior articulation angle information). Controller 140 may determine the change in the articulation angle based on the comparison. Controller 140 may determine whether an object has been detected in an articulation angle portion of the object detection area corresponding to the articulation angle, based on detecting the change in the articulation angle.

Controller 140 may adjust, based on the articulation angle, the size of the object detection area to obtain the adjusted object detection area, as described herein. Controller 140 may adjust the size of the object detection area to obtain the adjusted object detection area in order to determine whether an object has been detected in the adjusted object detection area and, thereby, prevent erroneously detecting portions of machine 100 as obstructions.

In some examples, controller 140 may obtain, from the memory associated with controller 140, the information identifying the object detection area. Controller 140 may obtain the information identifying the object detection area based on determining the articulation angle, based on receiving the object detection request, based on receiving a request for the information identifying the object detection area, and/or the like.

After obtaining the information identifying the object detection area, controller 140 may obtain, from data storage 340, size information associated with the articulation angle. For example, after receiving the articulation angle information, controller 140 may obtain the size information using the information identifying the articulation angle (included in the articulation angle information). The size information may identify an articulation angle portion of the object detection area corresponding to the articulation angle. Controller 140 may identify the articulation angle portion of the object detection area (corresponding to the articulation angle) based on the size information (obtained using the information identifying the articulation angle).

Controller 140 may adjust, based on the articulation angle portion of the object detection area (corresponding to the articulation angle), the size of the object detection area to obtain the adjusted object detection area. Controller 140 may adjust the size of the object detection area to a size corresponding to the articulation angle portion. For example, controller 140 may identify the boundaries of the articulation angle portion (e.g., identified in the size information) and adjust the size of the object detection area based on the boundaries of the articulation angle portion. For instance, controller 140 may adjust the size of the object detection area to a size that corresponds to the boundaries of the articulation angle portion. Accordingly, an object detected in a machine portion (associated with the articulation angle) may be removed from consideration.

Controller 140 may increase the size of the adjusted object detection area as the articulation angle increases (e.g., increases with respect to a last articulation angle of machine 100). Alternatively, controller 140 may decrease the size of the adjusted object detection area as the articulation angle decreases (e.g., decreases with respect to a last articulation angle of machine 100). In some examples, the size of the object detection area (prior to being adjusted) may correspond to a default size or correspond to a size that is based on a last adjustment of the object detection area (e.g., an adjustment based on a prior articulation angle portion).

Controller 140 may store information identifying the adjusted object detection area in a memory associated with controller 140. The information identifying the adjusted object detection area may include information identifying a size of the adjusted object detection area, boundaries of the adjusted object detection area, and/or the like. In some implementations, controller 140 may configure articulation area sensor device 150, using the information identifying the adjusted object detection area, to cause articulation area sensor device 150 to detect objects within the adjusted object detection area (instead of detecting objects in an entirety of the object detection area).

For example, controller 140 may obtain the information identifying the adjusted object detection area (e.g., from the memory associated with controller 140) and/or the size information identifying the articulation angle portion (e.g., using the articulation angle information). Controller 140 may configure articulation area sensor device 150, using the information identifying the adjusted object detection area and/or the size information identifying the articulation angle portion, to detect objects located within the articulation angle portion and disregard objects located outside of the articulation angle portion (e.g., objects located within the machine portion). In this regard, articulation area sensor device 150 may include, in the object detection information, information regarding the objects detected within the articulation angle portion and exclude information regarding the objects detected within the machine portion.

In some examples, prior to adjusting the size of the object detection area, controller 140 may determine whether a speed of machine 100 satisfies a threshold speed. For instance, controller 140 may determine the speed of machine 100 using a speed sensor device (not shown) of machine 100. The speed sensor device may include a device that detects and/or monitors a speed of machine 100 (e.g., an engine speed sensor, an accelerometer, and/or the like). The information identifying the threshold speed may be stored in a memory associated with machine 100. The threshold speed may be determined by an operator associated with machine 100, determined by controller 140 (e.g., based on historical data identifying threshold speed associated with detecting objects in the object detection area), and/or the like.

Controller 140 may obtain information identifying the speed of machine 100 from the speed sensor, obtain the information identifying the threshold speed from the memory associated with machine 100, and compare the speed and the threshold speed to determine whether the speed satisfies the threshold speed. Controller 140 may proceed with adjusting the size of the object detection area if the speed of machine 100 does not satisfy the threshold speed. If the speed of machine 100 satisfies the threshold speed, controller 140 may refrain from adjusting the size of the object detection area and from determining whether an object has been detected the adjusted object detection area (e.g., because a speed of machine 100, that satisfies the threshold speed, may prevent machine 100 from further articulating in a direction corresponding to the articulation angle).

Controller 140 may determine, based on information from articulation area sensor device 150, that an object is detected in the adjusted object detection area. By determining that an object is detected in the adjusted object detection area, controller 140 may prevent erroneously detecting portions of machine 100 as obstructions.

To determine whether an object is detected in the adjusted object detection area, controller 140 may transmit, to articulation area sensor device 150, a detection area request for the object detection information. For instance, controller 140 may transmit, to articulation area sensor device 150, the detection area request (e.g., based on determining the articulation angle of machine 100, based on adjusting the size of the object detection area, and/or the like) and obtain the object detection information from articulation area sensor device 150. Alternatively, controller 140 may transmit the detection area request to articulation area sensor device 150 based on receiving the object detection request and obtain the object detection information from articulation area sensor device 150 based on the detection area request.

Alternatively, controller 140 may transmit the detection area request to articulation area sensor device 150 periodically (e.g., in a manner similar to the manner described herein with respect to transmitting the articulation angle request) and obtain the object detection information from articulation area sensor device 150. In some instances, the object detection request may include the information identifying the adjusted object detection area and/or the size information identifying the articulation angle portion to cause articulation area sensor device 150 to detect objects included in the articulation angle portion of the object detection area (instead of detecting objects included in an entirety of the object detection area).

Alternatively, controller 140 may obtain, from a memory associated with controller 140 (e.g., memory 320), object detection information previously received from the articulation area sensor device 150 (hereinafter "prior object detection information"). For example, controller 140 may obtain the prior object detection information from the memory associated with controller 140 if the prior object detection information was obtained from articulation area sensor device 150 (prior to the detection area request) within a threshold amount of time from receiving the detection area request.

Controller 140 may analyze the object detection information to determine whether any object is detected in the adjusted object detection area. For example, based on articulation area sensor device 150 being configured using the information identifying the adjusted object detection area and/or based on the object detection request (including the information identifying the adjusted object detection area and/or the size information identifying the articulation angle portion (as explained above)), the object detection information may include information regarding the objects located within the articulation angle portion and exclude information regarding the objects located outside of the articulation angle portion (e.g., within machine 100 portion).

Alternatively, if the object detection information includes information regarding an entirety of the object detection area, controller 140 may analyze the object detection information (e.g., using the information identifying the adjusted object detection area and/or the size information identifying the articulation angle portion). Based on the analysis, controller 140 may determine whether an object is detected in a portion of the object detection information that corresponds to the adjusted object detection area and disregard any information outside of the portion of the object detection information that corresponds to the adjusted object detection area (e.g., disregard any object detected outside of the portion of the object detection information that corresponds to the adjusted object detection area).

For instance, controller 140 may use the size information (identifying the articulation angle portion) to identify the portion of the object detection information that corresponds to the adjusted object detection area. Alternatively, controller 140 may obtain the information identifying the adjusted object detection area from the memory associated with controller 140 and use the information identifying the adjusted object detection area to identify the portion of the object detection information that corresponds to the adjusted object detection area. Controller 140 may analyze the portion of the object detection information that corresponds to the adjusted object detection area to determine whether an object has been detected in the portion of the object detection information that corresponds to the adjusted object detection area (without analyzing any information outside of the portion of the object detection information that corresponds to the adjusted object detection area).

Controller 140 may analyze the portion of the object detection information (corresponding to the articulation angle) to determine whether such portion includes information indicating that an object has been detected in such portion. Controller 140 may detect an object as result of the analysis. In some examples, controller 140 may analyze the portion of the object detection information corresponding to the articulation angle using one or more object detection techniques (e.g., a Single Shot Detector (SSD) technique, a You Only Look Once (YOLO) technique, and/or the like) to determine whether an object is detected in the portion of the object detection information corresponding to the articulation angle.

Controller 140 may perform an action based on the object being detected in the adjusted object detection area, as described herein. In some examples, controller 140 may prevent movement of machine 100. For example, controller 140 may prevent an articulation of machine 100, prevent a steering of machine 100, prevent a forward movement and a backward movement of machine 100, and/or the like. Additionally, or alternatively, controller 140 may cause a notification to be provided to the operator. For example, the notification may include an audible notification (e.g., an alarm), a visual notification, and/or the like. Additionally, or alternatively, controller 140 may cause machine 100 to articulate in a direction opposite with respect to a direction in which machine 100 was articulating to reach the articulation angle. For example, controller 140 may cause machine 100 to articulate in the opposite direction until machine 100 reaches a particular position.

Additionally, or alternatively, controller 140 may use a machine learning model to identify (or predict) the action to performed (e.g., based on the object being detected in the adjusted object detection area). The machine learning model may be trained (e.g., by controller 140, another device, and/or system) using historical data. The historical data may include historical data identify objects, object detection areas, adjusted object detection areas, articulation angle portions, actions performed based on detecting the objects, and/or the like. As a result of training, the machine learning model may be used to identify (or predict) the action to be performed based on the object being detected in the adjusted object detection area. In some implementations, the machine learning model may be updated (or retrained) based on information identifying the object, the adjusted object detection area, and the action performed based on the object being detected in the adjusted object detection area.

Additionally, or alternatively, controller 140 may transmit, to the device associated with the operator, detected object information indicating that the object has been detected in the adjusted object detection area. For example, controller 140 may transmit the detected object information to user device 330, the user interfaces of an operator cabin of machine 100 (e.g., operator cabin 134), and/or the like. The detected object information may include information identifying the object detection area, a location of the object in the object detection area, a location of the object with respect to machine 100, and/or the like.

In some examples, based on transmitting the information indicating that the object has been detected, controller 140 may receive, from the device associated with the operator, information indicating that the object is a component of machine 100. Based on receiving the information indicating that the object is the component of machine 100, controller 140 may update the size information (identifying the articulation angle portion) to exclude, from the articulation angle portion, a portion that identifies the component. For example, controller 140 may update the boundaries of the articulation angle portion to remove the portion that identifies the component. Controller 140 may update data storage 340 using the updated size information.

The number and arrangement of devices and networks shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of system 300 may perform one or more functions described as being performed by another set of devices of system 300.

Figure 4:
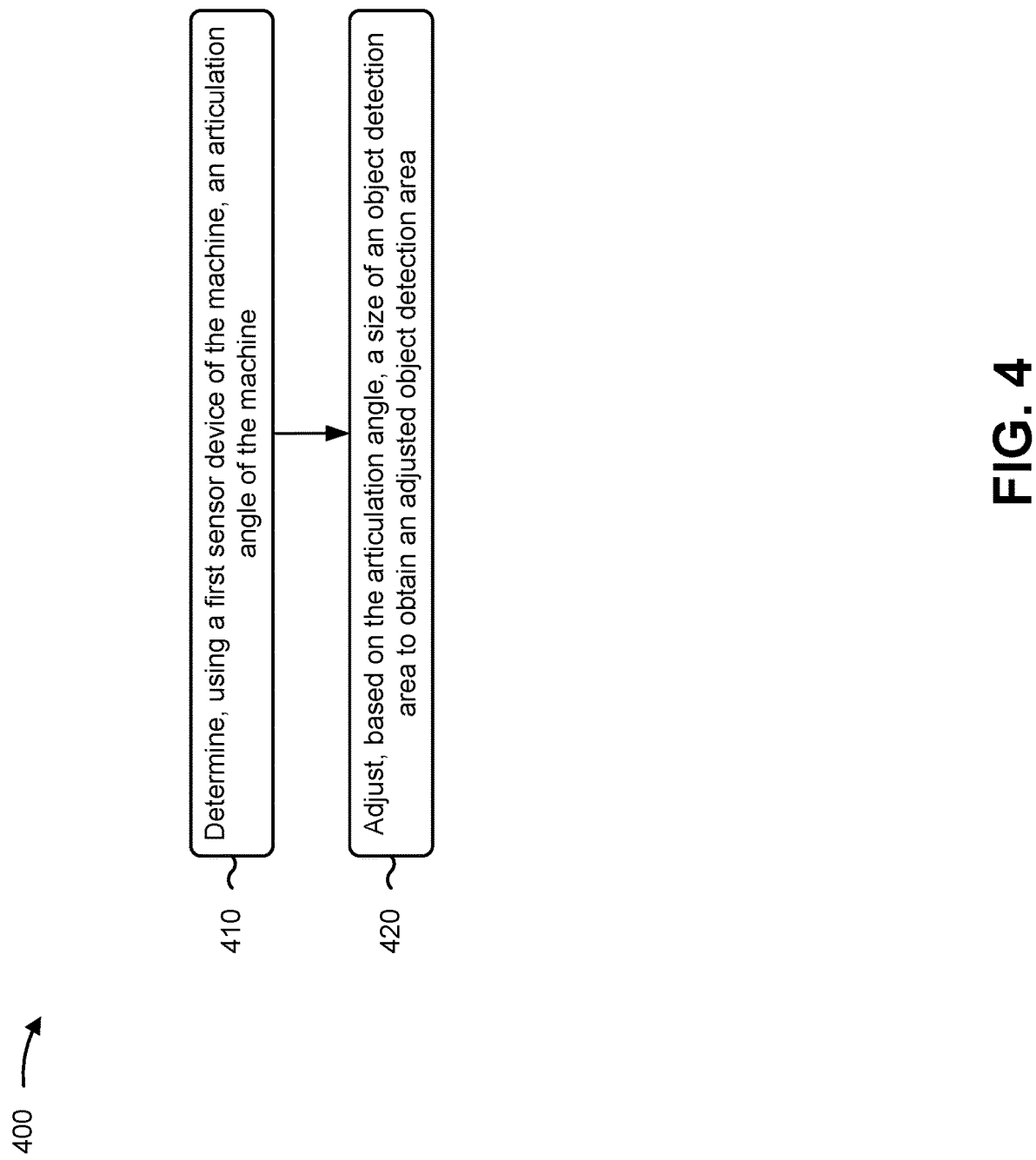
FIG. 4 is a flow chart of an example process relating to determining an object detection area based on an articulation angle of a machine.

FIG. 4 is a flowchart of an example process 400 associated with adjusting object detection area based on articulation angle. In some implementations, one or more process blocks of FIG. 4 may be performed by a controller (e.g., controller 140). In some implementations, one or more process blocks of FIG. 4 may be performed by another device or a group of devices separate from or including the controller, such as an articulation area sensor device (e.g., articulation area sensor device 150), an articulation sensor device (e.g., articulation sensor device 160), and a data storage (e.g., data storage 340), and/or the like. Additionally, or alternatively, the controller may perform one or more process blocks of FIG. 4 using a processor (e.g., processor 310) and/or a memory (e.g., memory 320).

As shown in FIG. 4, process 400 may include determining, using a first sensor device of the machine, an articulation angle of the machine (block 410). For example, the controller may determine, using the articulation sensor device of the machine, an articulation angle of the machine, as described herein. The first sensor device may include the articulation sensor device.

As further shown in FIG. 4, process 400 may include adjusting, based on the articulation angle, a size of an object detection area to obtain an adjusted object detection area, the object detection area being associated with an articulation joint of the machine (block 420). For example, the controller may adjust, based on the articulation angle, the size of the object detection area to obtain the adjusted object detection area, as described herein. In some examples, adjusting the size of the object detection area comprises: adjusting the size of the object detection area based on the articulation angle.

In some examples, adjusting the size of the object detection area based on the articulation angle includes: increasing the size of the object detection area as the articulation angle increases; or decreasing the size of the object detection area as the articulation angle decreases. In some examples, adjusting the size of the object detection area comprises: adjusting the size of the object detection area when the speed of the machine does not satisfy the threshold speed.

In some examples, adjusting the size of the object detection area comprises: obtaining, from a data structure associated with the machine and using information identifying the articulation angle, size information identifying a portion of the object detection area, and adjusting the size of the object detection area based on the size information; and the method further comprises: receiving, from the device, information indicating that the object is a component of the machine Process 400 may further include determining, based on information from a second sensor device, that an object is detected in the adjusted object detection area. For example, the controller may determine, based on information from a second sensor device, that an object is detected in the adjusted object detection area, as described herein. The second sensor device may include the articulation area sensor device and the information from the second sensor device may include the object detection information.

Process 400 may further include performing an action based on the object being detected in the adjusted object detection area. For example, the controller may perform an action based on the object being detected in the adjusted object detection area, as described herein. In some examples, performing the action comprises: preventing movement of the machine. In some examples, performing the action comprises: transmitting, to a device associated with an operator of the machine, information indicating that the object has been detected in the adjusted object detection area.

Additionally, or alternatively, the controller may transmit, to the device associated with the operator, detected object information indicating that the object has been detected in the adjusted object detection area. For example, the controller may transmit the detected object information to the user interfaces of an operator cabin of the machine (e.g., operator cabin 134), to a user device of the operator (e.g., user device 330), and/or the like. The detected object information may include information identifying the object detection area, a location of the object in the object detection area, an outline of the machine, a location of the object with respect to the machine, and/or the like.

In some examples, based on transmitting the information indicating that the object has been detected, the controller may receive, from the device associated with the operator, information indicating that the object is a component of the machine. Based on receiving the information indicating that the object is the component of the machine, the controller may update the size information (identifying the articulation angle portion) to exclude, from the articulation angle portion, a portion that identifies the component. For example, the controller may update the boundaries of the articulation angle portion to remove the portion that identifies the component. The controller may update the data storage using the updated size information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

This disclosure relates to a process for determining an object detection area based on an articulation angle of a machine to prevent erroneously detecting portions of the machine as obstructions. Erroneously detecting portions of the machine as obstructions may waste machine resources that are used to alert the operator of the machine of the obstructions, may waste machine resources that are used to prevent movement of the machine based on detecting the obstructions, may waste computing resources that are used by the operator to indicate that the obstructions are portions of the machine (e.g., components of the machine), may waste machine resources that are used to resume operation and movement of the machine, and/or the like.

The disclosed process for determining an object detection area based on an articulation angle of a machine may resolve the issues mentioned above with respect to erroneously detecting portions of the machine as obstructions. For example, a controller (e.g., controller 140) may identify a portion of the object detection area corresponding to an articulation angle of the machine and determine whether an object is detected in the portion of the object detection area corresponding to the articulation angle of the machine. Several advantages may be associated with the disclosed process for determining an object detection area based on an articulation angle of a machine.

For example, by identifying the portion of the object detection area corresponding to the articulation angle of the machine, the process may prevent erroneously detecting portions of the articulated machine as obstructions to the articulated machine. By preventing erroneously detecting portions of the articulated machine as obstructions, the process may prevent (or limit) any disruption in the operation of the articulated machine. By preventing erroneously detecting portions of the articulated machine as obstructions, the process may preserve computing or machine resources that would have otherwise been used to alert an operator of the articulated machine, used to prevent movement of the machine, used by the operator to indicate that the objects are portions of the articulated machine, and/or the like. By preventing erroneously detecting portions of the articulated machine as obstructions, the process may preserve machine resources that would have otherwise been used to resume operation and movement of the machine.

The foregoing disclosure provides illustration and description, but is not intended to be exhaustive or to limit the implementations to the precise form disclosed. As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A method performed by a controller of a machine, the method comprising:
    detecting, based on information from a first sensor device of the machine, a change in an articulation angle of the machine,
        wherein the articulation angle is associated with an articulation joint of the machine; and
    adjusting, based on detecting the change in the articulation angle, a size of an object detection area to obtain an adjusted object detection area,
        wherein the object detection area is associated with the articulation joint of the machine.

2. The method of claim 1, wherein adjusting the size of the object detection area comprises:
    adjusting the size of the object detection area based on the articulation angle.

3. The method of claim 2, wherein adjusting the size of the object detection area based on the articulation angle includes:
    increasing the size of the adjusted object detection area as the articulation angle increases; or
    decreasing the size of the adjusted object detection area as the articulation angle decreases.

4. The method of claim 1, further comprising:
    determining, based on information from a second sensor device, that an object is detected in the adjusted object detection area; and
    performing an action based on the object being detected in the adjusted object detection area,
    wherein performing the action comprises:
        preventing movement of the machine.

5. The method of claim 1, further comprising:
    detecting whether a speed of the machine satisfies a threshold speed; and
    wherein adjusting the size of the object detection area comprises:
        adjusting the size of the object detection area when the speed of the machine does not satisfy the threshold speed.

6. The method of claim 1, further comprising:
    determining, based on information from a second sensor device, that an object detected in the adjusted object detection area; and performing an action based on the object being detected in the adjusted object detection area,
wherein performing the action comprises:
transmitting, to a device associated with an operator of the machine, information indicating that the object has been detected in the adjusted object detection area.

7. The method of claim 6, wherein adjusting the size of the object detection area comprises:
obtaining, from a data storage associated with the machine and using information identifying the articulation angle, size information identifying a portion of the object detection area; and
adjusting the size of the object detection area based on the size information; and
wherein the method further comprises:
receiving, from the device, information indicating that the object is a component of the machine;
updating the size information to exclude, from the portion of the object detection area, a portion that identifies the component; and
updating the data storage using the updated size information.

8. A controller of a machine, the controller comprising:
one or more memories; and
one or more processors configured to:
determine, using a first sensor device of the machine, an articulation angle of the machine; and
adjust, based on the articulation angle, a size of an object detection area to obtain an adjusted object detection area,
the object detection area being associated with an articulation joint of the machine.

9. The controller of claim 8, wherein the one or more processors are configured to:
determine, based on information from a second sensor device, that an object is detected in the adjusted object detection area; and
perform an action based on the object being detected in the adjusted object detection area,
wherein, when performing the action, the one or more processors are configured to:
transmit, to a device associated with an operator of the machine, information indicating that the object has been detected in the adjusted object detection area.

10. The controller of claim 8, wherein the one or more processors are further configured to:
generate size information that identifies a portion of the object detection area corresponding to the articulation angle; and
store the size information, in a data storage, in association with information identifying the articulation angle prior to determining the articulation angle; and
wherein, when adjusting the size of the object detection area, the one or more processors are configured to:
obtain, from the data storage and using the information identifying the articulation angle, the size information; and
adjust the size of the object detection area based on the size information.

11. The controller of claim 8, wherein the one or more processors are configured to determine, based on information from a second sensor device, that an object is detected in the adjusted object detection area,
wherein the first sensor device includes an articulation sensor device, and
wherein the second sensor device includes an articulation area sensor device.

12. The controller of claim 8, wherein the one or more processors are further configured to:
detect whether a speed of the machine satisfies a threshold speed; and
wherein, when adjusting the size of the object detection area, the one or more processors are configured to:
adjust the size of the object detection area when the speed of the machine does not satisfy the threshold speed.

13. The controller of claim 8, wherein the size of the adjusted object detection area is based on an amount of space between a front portion of the machine and a rear portion of the machine as a result of an articulation of the machine to the articulation angle.

14. The controller of claim 8, wherein the one or more processors are configured to:
determine, based on information from a second sensor device, that an object is detected in the adjusted object detection area; and
perform an action based on the object being detected in the adjusted object detection area,
wherein, when performing the action, the one or more processors are configured to prevent at least one of:
an articulation of the machine,
a steering of the machine, or
a forward movement and a backward movement of the machine.

15. A system, comprising:
one or more sensor devices of a machine; and
a controller, of the machine, configured to:
determine, based on the one or more sensor devices, an articulation angle of the machine; and
identify, based on the articulation angle of the machine, a portion of an object detection area,
the object detection area being associated with an articulation joint of the machine.

16. The system of claim 15, wherein the one or more sensor devices include:
an articulation sensor device, and
an articulation area sensor device.

17. The system of claim 16, wherein the controller is further configured to:
obtain, from the articulation sensor device, information identifying the articulation angle;
wherein, when identifying the portion of the object detection area, the controller is configured to identify, based on the information identifying the articulation angle, the portion of the object detection area; and
wherein the controller is configured to determine, based on information from the articulation area sensor device, that an object is detected in the portion of the object detection area.

18. The system of claim 15, wherein a size of the portion of the object detection area is based on an amount of space between a front portion of the machine and a rear portion of the machine as a result of an articulation of the machine to the articulation angle.

19. The system of claim 15, wherein the controller is configured to:
determine, based on information from the one or more sensor devices, that an object is detected in the portion of the object detection area; and
perform an action based on the object being detected in the portion of the object detection area, wherein, when performing the action, the controller is configured to at least one of:
  transmit, to a device associated with an operator of the machine, information indicating that the object has been detected in the portion of the object detection area; or
  prevent movement of the machine.

20. The system of claim 15, wherein the controller is further configured to:
  detect whether a speed of the machine satisfies a threshold speed; and
  wherein, when determining the object detection area, the controller is configured to:
    determine the object detection area when the speed of the machine does not satisfy the threshold speed.

* * * * *